(12) United States Patent
Eguchi et al.

(10) Patent No.: US 12,208,906 B2
(45) Date of Patent: Jan. 28, 2025

(54) PROPULSION APPARATUS, FLYING BODY AND PROPULSION METHOD

(71) Applicant: MITSUBISHI HEAVY INDUSTRIES, LTD., Tokyo (JP)

(72) Inventors: Masayuki Eguchi, Tokyo (JP); Toshiharu Fujita, Tokyo (JP); Yukihiro Okumura, Tokyo (JP)

(73) Assignee: MITSUBISH HEAVY INDUSTRIES, LTD., Tokyo (JP)

( * ) Notice: Subject to any disclaimer, the term of this patent is extended or adjusted under 35 U.S.C. 154(b) by 284 days.

(21) Appl. No.: 17/628,301

(22) PCT Filed: Feb. 3, 2021

(86) PCT No.: PCT/JP2021/003950
§ 371 (c)(1),
(2) Date: Jan. 19, 2022

(87) PCT Pub. No.: WO2021/161873
PCT Pub. Date: Aug. 19, 2021

(65) Prior Publication Data
US 2022/0250754 A1    Aug. 11, 2022

(30) Foreign Application Priority Data
Feb. 13, 2020    (JP) .................................. 2020-022075

(51) Int. Cl.
*B64D 27/02*    (2006.01)
*F02K 9/56*    (2006.01)

(52) U.S. Cl.
CPC .............. *B64D 27/023* (2013.01); *F02K 9/56* (2013.01); *F02K 9/566* (2013.01)

(58) Field of Classification Search
CPC ................................................... B64D 27/023
See application file for complete search history.

(56) References Cited

U.S. PATENT DOCUMENTS 4,676,457 A * 6/1987 Allen ....................... B64D 1/14
244/17.15
5,129,602 A * 7/1992 Leonard .................. B64G 1/641
244/172.2
(Continued)

FOREIGN PATENT DOCUMENTS

JP    08-192796    7/1996
JP    2001-322600    11/2001
(Continued)

OTHER PUBLICATIONS

International Search Report issued Mar. 23, 2021 in International Application No. PCT/JP2021/003950.
(Continued)

*Primary Examiner* — David P. Olynick
(74) *Attorney, Agent, or Firm* — Wenderoth, Lind & Ponack, L.L.P.

(57) ABSTRACT

A propulsion apparatus is provided with a gas generator and a plurality of thrusters. The gas generator generates combustion gas when a flying body satisfies an emergency condition. Herein, the plurality of thrusters output the combustion gas downward. In addition, when viewed from a direction of travel of the flying body, the plurality of thrusters may overlap the gas generator. Furthermore, the plurality of thrusters may control an attitude of the flying body. In addition, the plurality of thrusters may reduce outputs of the combustion gas to a first output based on a landing of at least a part of the flying body.

14 Claims, 15 Drawing Sheets

(56) References Cited

U.S. PATENT DOCUMENTS

| | | | | |
|---|---|---|---|---|
| 5,568,901 | A * | 10/1996 | Stiennon | B64G 1/403 244/171.3 |
| 5,765,778 | A | 6/1998 | Otsuka | |
| 8,844,876 | B2 * | 9/2014 | Prampolini | B64G 1/62 244/158.9 |
| 9,457,918 | B2 * | 10/2016 | Hand | B64G 1/62 |
| 10,531,994 | B2 * | 1/2020 | Groden | G06Q 10/02 |
| 10,538,343 | B2 * | 1/2020 | Kobayakawa | B64G 1/62 |
| 2003/0042367 | A1 | 3/2003 | Carpenter | |
| 2014/0145036 | A1 | 5/2014 | Fujita et al. | |
| 2017/0349301 | A1 | 12/2017 | Bezos et al. | |
| 2018/0319486 | A1 * | 11/2018 | Elyashiv | F02K 9/24 |
| 2020/0094953 | A1 | 3/2020 | Kondo | |
| 2020/0369391 | A1 * | 11/2020 | Sloman | F02K 9/00 |
| 2022/0063803 | A1 * | 3/2022 | Dixon | B64C 25/44 |

FOREIGN PATENT DOCUMENTS

| | | |
|---|---|---|
| JP | 2014-104894 | 6/2014 |
| JP | 2018-111474 | 7/2018 |
| JP | 6425323 | 11/2018 |
| JP | 2018-537361 | 12/2018 |
| WO | 2018/156972 | 8/2018 |

OTHER PUBLICATIONS

International Preliminary Report on Patentability issued Aug. 25, 2022 in International Application No. PCT/JP2021/003950.

Extended European Search Report issued Oct. 12, 2022 in corresponding European Patent Application No. 21753928.7.

* cited by examiner

PROPULSION APPARATUS, FLYING BODY AND PROPULSION METHOD

TECHNICAL FIELD

The present invention relates to a propulsion apparatus, a flying body and a propulsion method.

BACKGROUND

Patent Literature 1 discloses a technology to improve automatic rotation of rotary-wing aircraft when an engine of the rotary-wing aircraft fails in flight. This rotary-wing aircraft is provided with an engine that propels the rotary-wing aircraft in a direction of travel in emergency. Due to the propulsive force in the direction of travel, the rotary-wing aircraft improves the automatic rotation.

As an engine technology, Patent Literature 2 discloses an attitude control device provided with a thruster.

CITED LIST

Patent Literature

[Patent Literature 1] Japanese patent application publication No. 2018-537361
[Patent Literature 2] Japanese patent application publication No. 2014-104894

SUMMARY

In view of the above situation, an objective is to provide a propulsion apparatus that reduces an impact of a fall of a flying body in emergency, for example in an engine failure. Other objectives will be understood from following disclosures and descriptions of embodiments.

A propulsion apparatus according to an embodiment to achieve the above objective is provided with a gas generator and a plurality of thrusters. The gas generator generates a combustion gas when at least a part of a flying body satisfies an emergency condition. The plurality of thrusters output the combustion gas downward.

A flying body according to an embodiment to achieve the above objective is provided with the above-mentioned propulsion apparatus.

A propulsion method according to an embodiment to achieve the above objective includes determining, by a processor, whether at least a part of a flying body satisfies an emergency condition or not. The propulsion method further includes generating a combustion gas when the emergency condition is satisfied and outputting the combustion gas downward the at least a part of the flying body.

According to the above embodiment, the propulsion apparatus can reduce an impact of a fall of a flying body.

DETAILED DESCRIPTION

In recent years, attention has been focused on small flying bodies, so-called flying cars. The inventors have found out that, in an emergency, for example in an engine failure, an impact should be reduced when a flying body landed in order to prevent occupants of the flying body from being injured by a fall. Furthermore, the inventors have found out that, since such a flying body may fly over a city, a fall on a city should be reduced. It should be noted that "landing" may include, not only a landing on a ground, but also a landing on a built structure such as a ship and a landing on a surface of water. In addition, a flying car may include wheels that are configured to drive on a road such as an ordinary road, a highway or the like.

Figure 1:
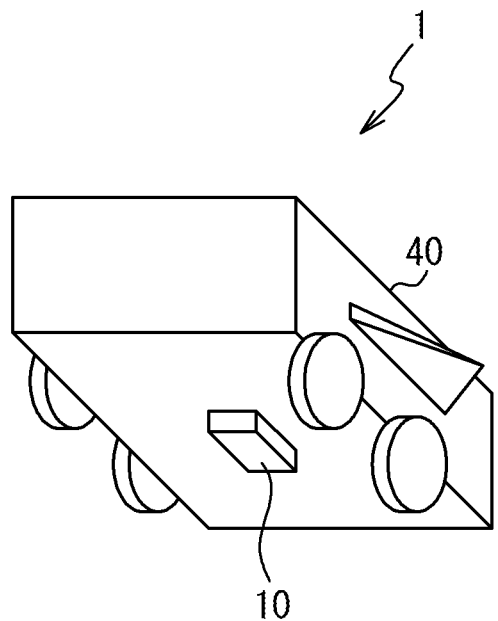
FIG. 1 is a schematic diagram of a flying body according to an embodiment.
Figure 2:
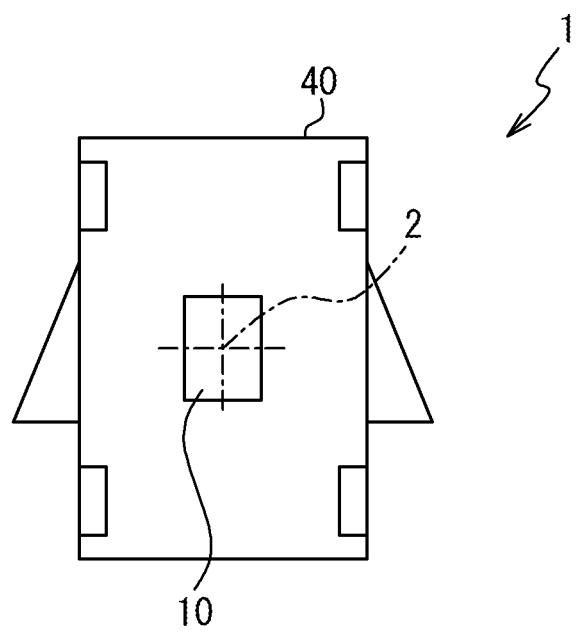
FIG. 2 is a schematic bottom view of a flying body according to an embodiment.

(Embodiment 1) As shown in FIG. 1, a flying body 1 according to an embodiment (for example: a flying car) is provided with a body 40 and a propulsion apparatus 10, that suppress a fall in an emergency, on an underside thereof. In an emergency of the flying body 1, for example when an engine is stopped due to a failure or the like, the propulsion apparatus 10 generates a thrust in an upward direction to reduce an impact when the flying body 1 lands. As shown in FIG. 2, when viewing the flying body 1 from below, the propulsion apparatus 10 is provided so as to overlap a center 2 of the flying body 1. The center 2 may be a center of mass of the flying body 1 or may be a center of gravity of the flying body 1, for example. The propulsion apparatus 10 may be detachably provided to the flying body 1.

Figure 3:
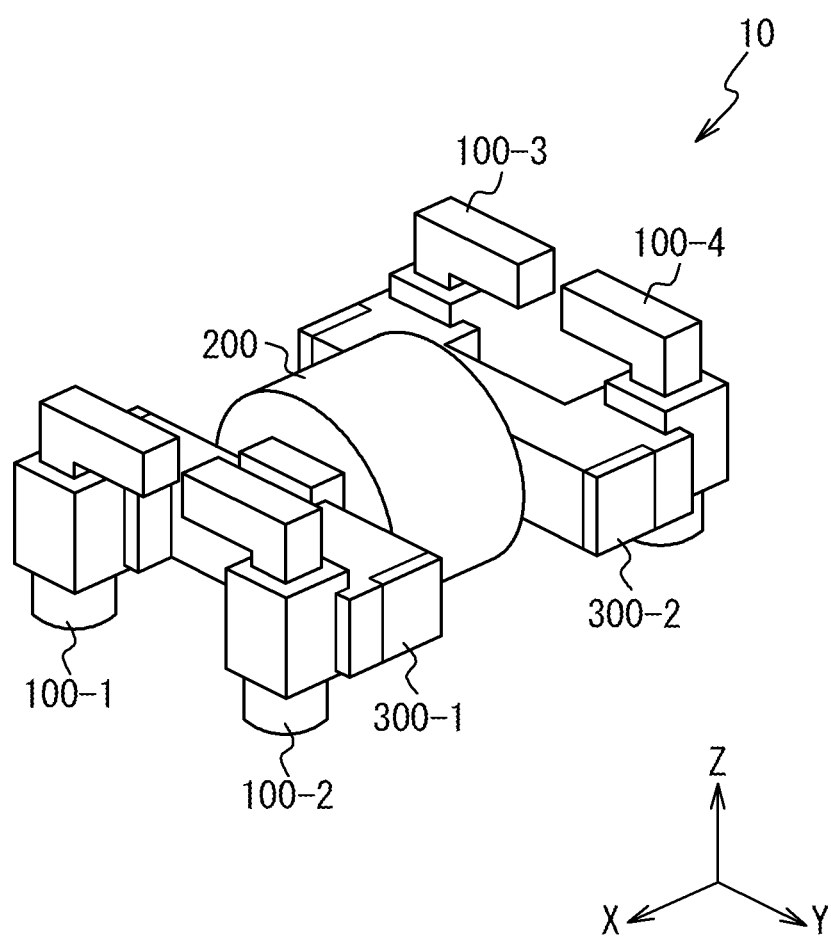
FIG. 3 is a schematic diagram of a propulsion apparatus according to an embodiment.

The propulsion apparatus 10 is configured to generate an upward thrust when attached to the flying body 1. As shown in FIG. 3, the propulsion apparatus 10 is provided with a plurality of thrusters 100 (including a first thruster 100-1, a second thruster 100-2, a third thruster 100-3 and a fourth thruster 100-4 for example), a gas generator 200 and manifolds 300 (including a first manifold 300-1 and a second manifold 300-2 for example). The thrusters 100 are configured to output a combustion gas, that the gas generator 200 generates, downward when the flying body 1 is flying, in an emergency. To facilitate understanding, the following will be described with: an upward direction when the flying body 1 is horizontally flying, a vertical upper direction for example, as +Z direction; a forward direction when the flying body 1 is horizontally flying as +X direction; and a direction perpendicular to the Z direction and X direction as Y direction.

The manifolds 300 are provided so as to sandwich the gas generator 200. The first manifold 300-1 is provided in the +X direction from the gas generator 200 and the second manifold 300-2 is provided in the −X direction from the gas generator 200.

The thrusters 100 are provided so as to sandwich the manifolds 300 and the gas generator 200. The first thruster 100-1 and the second thruster 100-2 are provided in the +X direction from the first manifold 300-1. The third thruster 100-3 and the fourth thruster 100-4 are provided in the −X direction from the second manifold 300-2.

The thrusters 100, the manifolds 300 and the gas generator 200 may be provided so as to be overlapped to each other when viewed from the X direction. By this configuration, a surface of the propulsion apparatus 10 when viewed from the +X direction, that is the direction of travel of the flying body 1, becomes smaller and air resistance of the flying body 1 can be reduced.

Figure 4:
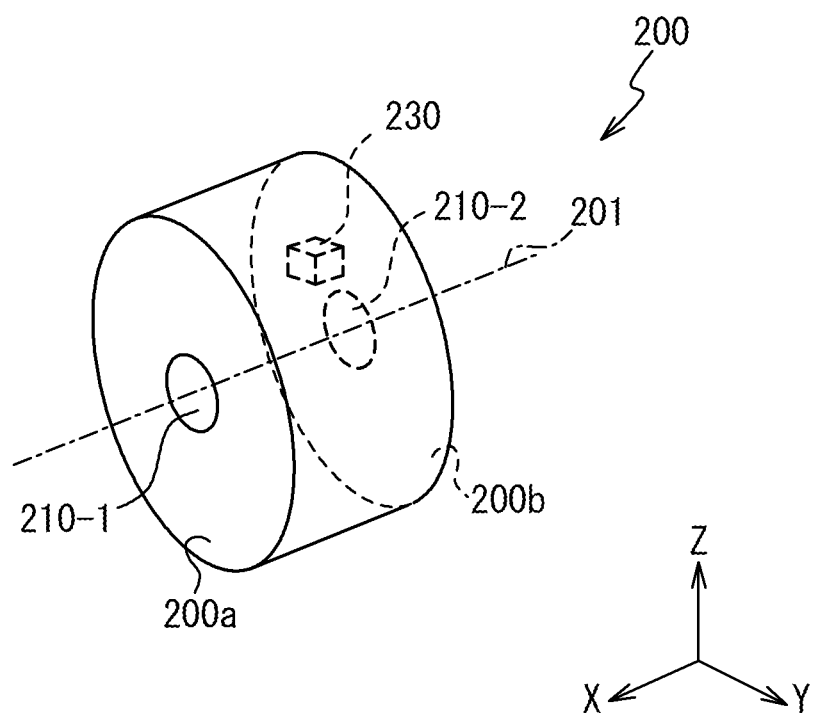
FIG. 4 is a schematic diagram of a gas generator according to an embodiment.

As shown in FIG. 4, the gas generator 200 is formed in a pillar shape having an axis parallel to the X axis, such as a cylindrical column shape. The gas generator 200 is provided with apertures 210, a first aperture 210-1 and a second aperture 210-2 for example, in a top surface 200*a* and a bottom surface 200*b* of the pillar shape. The first aperture 210-1 is provided in a geometric center of the top surface 200*a* for example, and the second aperture 210-2 is provided in a geometric center of the bottom surface 200*b* for example.

Figure 5:
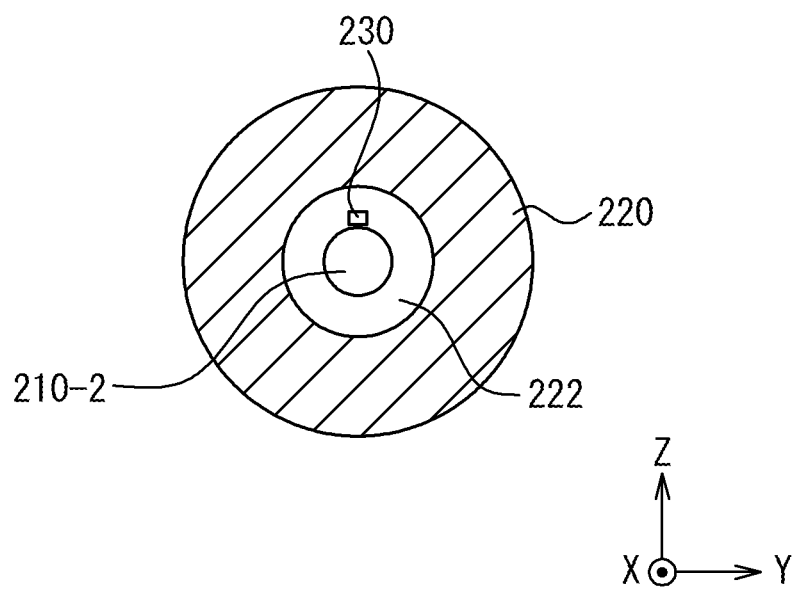
FIG. 5 is a cross-sectional view of a gas generator according to an embodiment.

The gas generator 200 is configured to generate the combustion gas in an emergency. The gas generator 200 is provided with fuel 220 and a pressure detector 230 inside. The fuel 220 includes a solid fuel for example and, as shown in FIG. 5, is provided in contact with a side surface of the gas generator 200. The fuel 220 has a penetration hole 222 with a pillar shape, a cylindrical column shape for example, of which axis is a segment that connects a geometrical center of the first aperture 210-1 and a geometrical center of the second aperture 210-2. The axis of the penetration hole 222 may be parallel to the X axis. The gas generator 200 generates the combustion gas by combusting the fuel 220. Arranging the fuel 220 in such a manner can reduce a difference of pressure of the combustion gases outputted from the first aperture 210-1 and the second aperture 210-2. In addition, the pressure detector 230 measures a pressure inside the gas generator 200.

Figure 6:
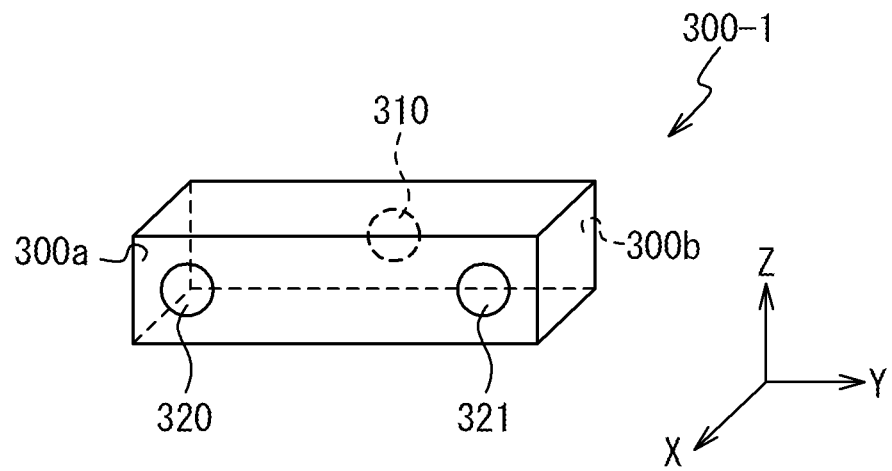
FIG. 6 is a schematic diagram of a manifold according to an embodiment.

As shown in FIG. 6, the first manifold 300-1 is provided with an aperture 310, an aperture 320 and an aperture 321 on X direction side surfaces. The aperture 310 is provided to be connected to the first aperture 210-1 of the gas generator 200. The aperture 310 may include a geometrical center of a side surface 300*b* of the first manifold 300-1 in the −X direction for example. The aperture 320 and the aperture 321 are provided to a side surface 300*a* of the first manifold 300-1 in the +X direction for example.

Figure 7:
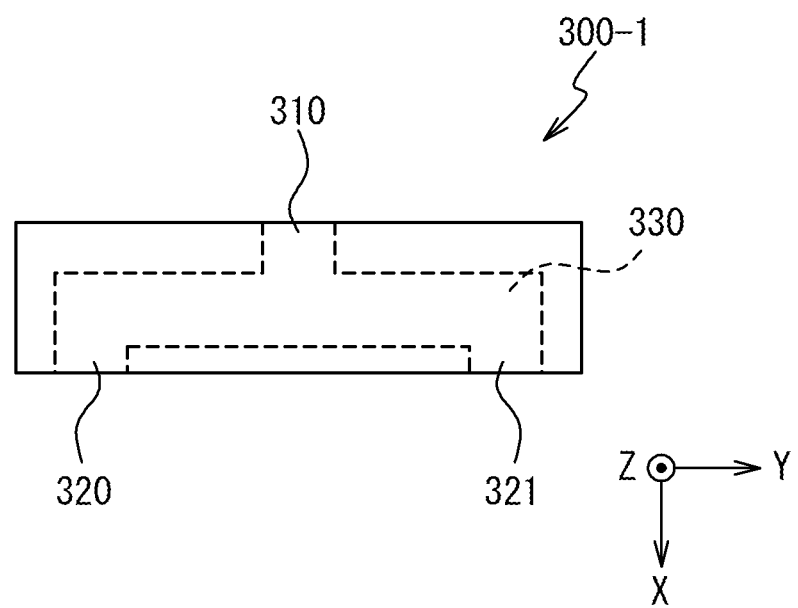
FIG. 7 is a top view of a manifold according to an embodiment.

The first manifold 300-1 is configured to send the combustion gas that the gas generator 200 generates to the thrusters 100, for example the first thruster 100-1 and the second thruster 100-2. As shown in FIG. 7, the first manifold 300-1 is provided with a piping 330 that connects the aperture 310, the aperture 320 and the aperture 321. The piping 330 is configured to guide the combustion gas, that the gas generator 200 generates, from the aperture 310 to the aperture 320 and the aperture 321.

The second manifold 300-2 is configured to send the combustion gas that the gas generator 200 generates to the thrusters 100, for example the third thruster 100-3 and the fourth thruster 100-4. The second manifold 300-2 has a configuration of the first manifold 300-1 inverted in the X direction.

Figure 8:
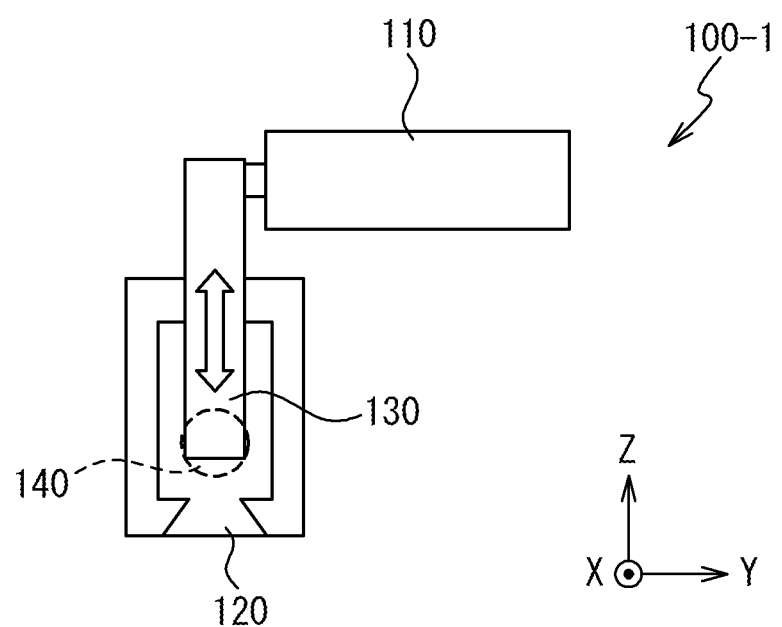
FIG. 8 is a cross-sectional view of a thruster according to an embodiment.

As shown in FIG. 8, the first thruster 100-1 is provided with an actuator 110, a pintle valve 120 and a valve body 130. The actuator 110 is configured to make a valve opening of the pintle valve 120 change by moving the valve body 130. For example, the actuator 110 moves the valve body 130 along the Z axis. As the valve body 130 moves, the valve opening of the pintle valve 120 changes.

The first thruster 100-1 is configured to output the combustion gas, that the gas generator 200 generates, from the pintle valve 120. The first thruster 100-1 is provided with an aperture 140 configured to connect to the aperture 320 of the first manifold 300-1. The combustion gas that the gas generator 200 generates is sent from the aperture 140 to inside of the first thruster 100-1 and outputted from the pintle valve 120. The output of the combustion gas changes based on the valve opening of the pintle valve 120.

Other thrusters 100, for example the second thruster 100-2, the third thruster 100-3 and the fourth thruster 100-4, have a configuration similar to the one of the first thruster 100-1. The aperture 140 of the second thruster 100-2 is configured to connect to the aperture 321 of the first manifold 300-1. The aperture 140 of the third thruster 100-3 is configured to connect to the aperture 320 of the second manifold 300-2. The aperture 140 of the fourth thruster 100-4 is configured to connect to the aperture 321 of the second manifold 300-2. Each thruster 100 is configured to output the combustion gas, that the gas generator 200 generates, from the pintle valve 120 based on the valve opening of the pintle valve 120.

Figure 9:
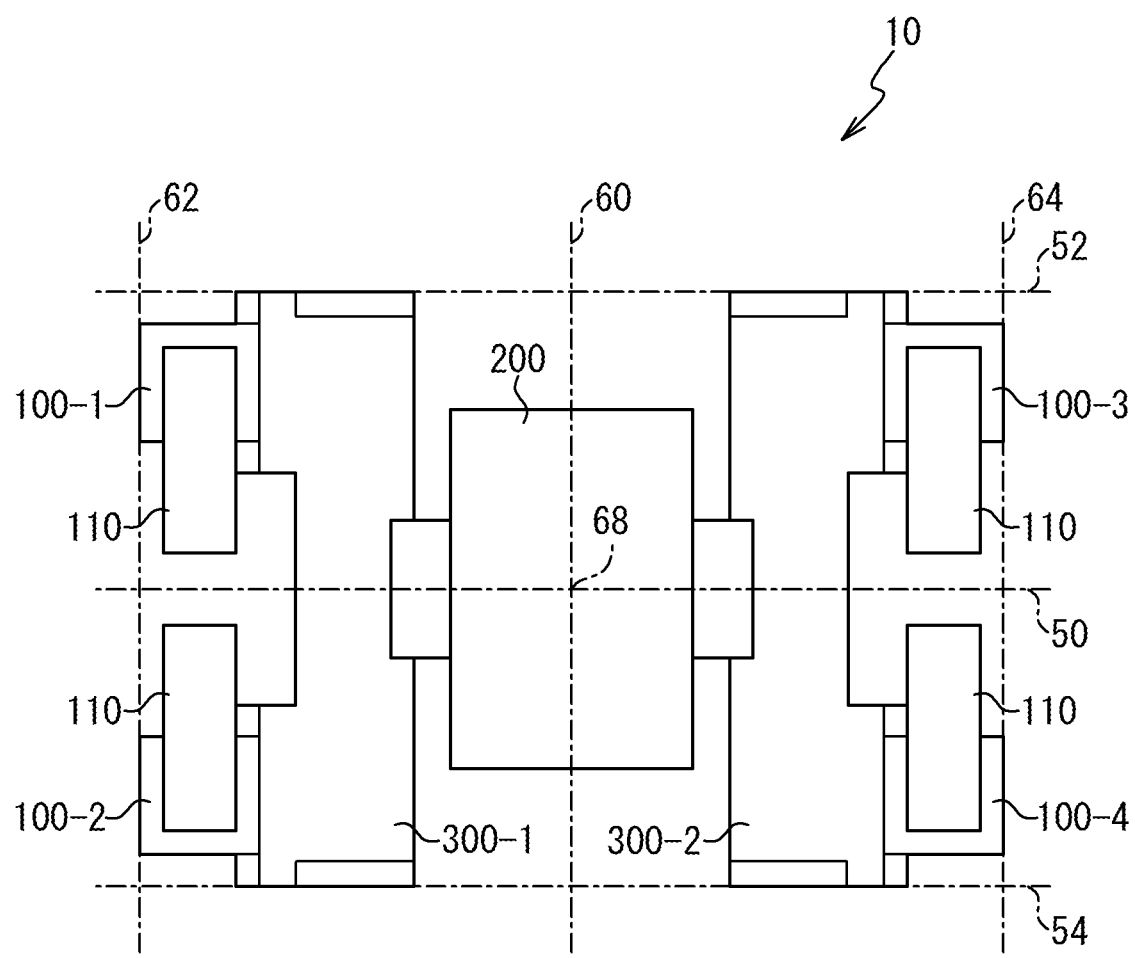
FIG. 9 is a top view of a propulsion apparatus according to an embodiment.

As shown in FIG. 9, the gas generator 200 may be provided to overlap a center 68 of the propulsion apparatus 10 when viewed from the +Z direction. The center 68 includes for example an intersection of a center line 60 of the propulsion apparatus 10 in the X direction and a center line 50 of the propulsion apparatus 10 in the Y direction. The center line 60 of the propulsion apparatus 10 in the X direction is located between a straight line 62 that passes through an edge in the +X direction and is parallel to the Y axis and a straight line 64 that passes through an edge in the −X direction and is parallel to the Y axis. For example, a distance from the center line 60 to the straight line 62 is equal to a distance from the center line 60 to the straight line 64. The center line 50 of the propulsion apparatus 10 in the Y direction is located between a straight line 54 that passes through an edge in the +Y direction and is parallel to the X axis and a straight line 52 that passes through an edge in the −Y direction and is parallel to the X axis. For example, a distance from the center line 50 to the straight line 54 is equal to a distance from the center line 50 to the straight line 52. The center 68 may be a geometrical center of the propulsion apparatus 10 viewed from the Z direction. By providing the gas generator 200 to overlap the center 68, the difference of pressure of the combustion gas outputted from each thruster 100 can be reduced.

The actuators 110 of the thrusters 100 may be extended toward the center line 50 or the center line 60 when viewed from the +Z direction. For example, the actuator 110 of the first thruster 100-1 is extended from a location of the pintle valve 120 toward the center line 50 when viewed from the +Z direction. The actuators 110 in other thrusters 100 are similarly extended from locations of the pintle valves 120 toward the center line 50. As a result, a surface of the propulsion apparatus 10 when viewed from the +X direction, that is the direction of travel of the flying body 1, becomes smaller and an air resistance of the flying body 1 can be reduced.

Figure 10:
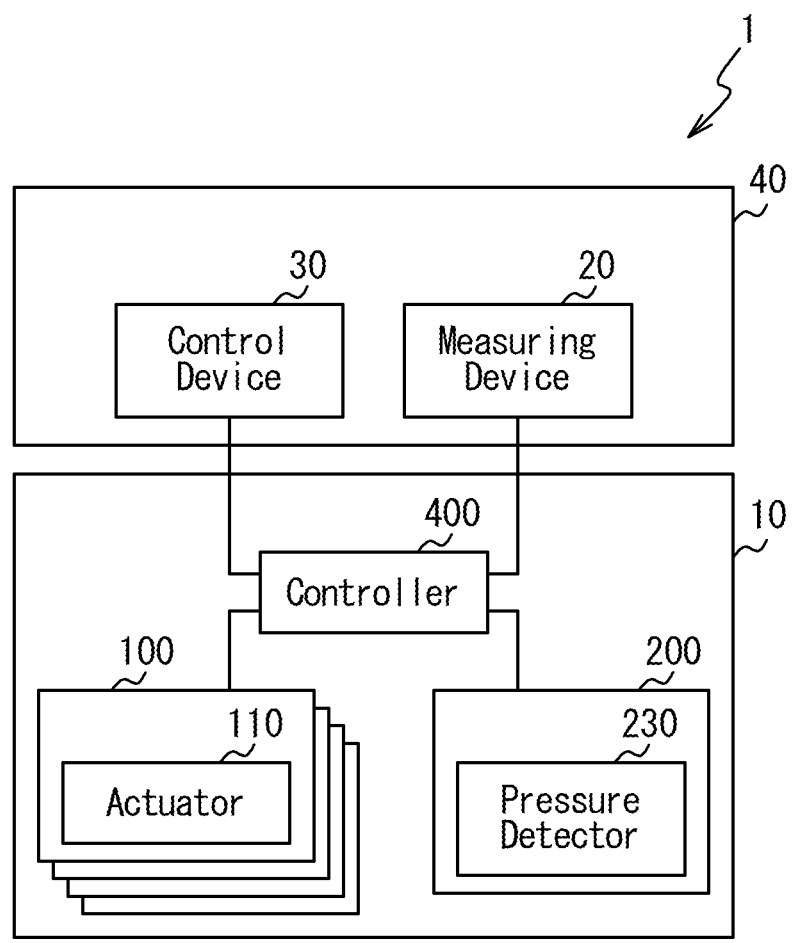
FIG. 10 is a configuration diagram of a propulsion apparatus according to an embodiment.

As shown in FIG. 10, the propulsion apparatus 10 is provided with a controller 400 that starts the gas generator 200. The controller 400 receives various types of status information from a measuring device 20 provided to the body 40 of the flying body 1. The status information includes, for example, an altitude, a speed, a tilt (including for example pitch, roll, yaw or the like), a location (including for example latitude, longitude or the like) or the like of the flying body 1. The controller 400 determines whether to start the gas generator 200 or not based on the status information of the flying body 1. The controller 400 may receive an emergency signal from a control device 30 and start the gas generator 200 based on the emergency signal.

The controller 400 controls the output of the thrusters 100 based on a pressure in the gas generator 200 and the status information of the flying body 1. The controller 400 receives information that indicates the pressure in the gas generator 200 from the pressure detector 230. In addition, the controller 400 receives the status information of the flying body 1 from the measuring device 20. The controller 400 controls the actuators 110 based on the information that indicates the pressure in the gas generator 200 and the status information of the flying body 1. The output of the thrusters 100 is controlled based on the control of the actuators 110. The controller 400 includes a computer for example.

Figure 11:
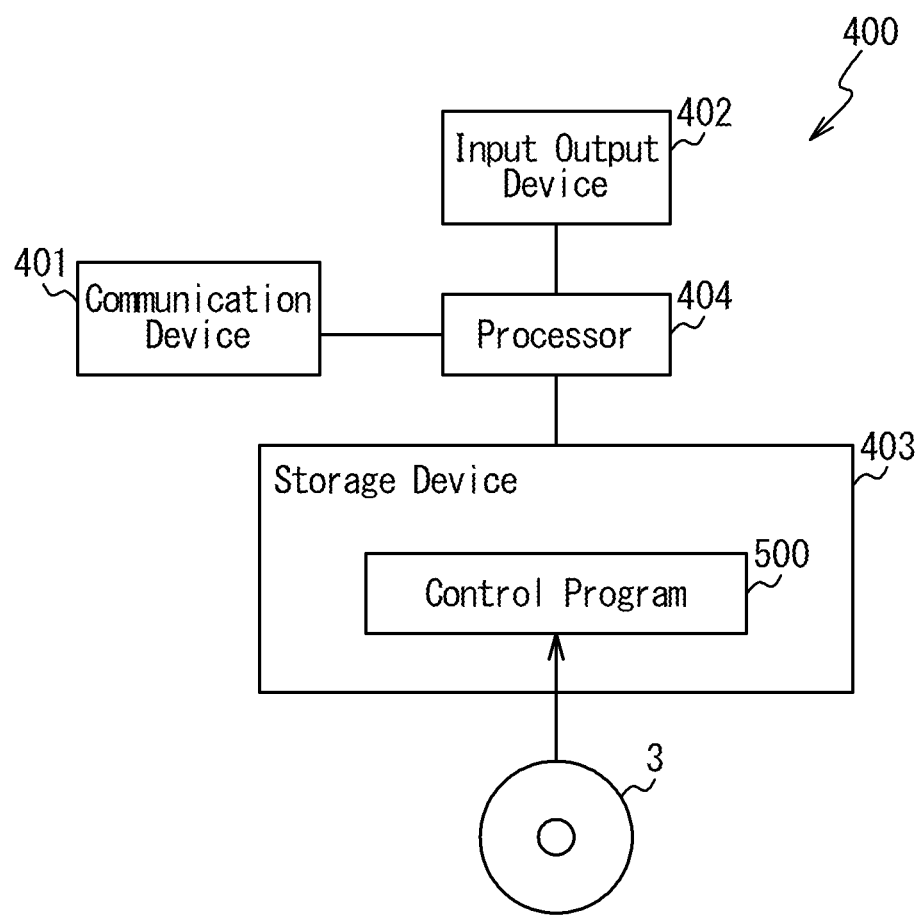
FIG. 11 is a configuration diagram of a controller according to an embodiment.

As shown in FIG. 11, the controller 400 is provided with a communication device 401, an input output device 402, a storage device 403 and a processor 404. The communication device 401 performs communications with other devices, for example the measuring device 20, the actuators 110 or the like. The communication device 401 transfers information received from the measuring device 20, the control device 30 and the pressure detector 230 to the processor 404. In addition, the communication device 401 transfers a control signal that the processor 404 generates to the actuators 110. The control signal includes, for example, information that indicates an output level of each thruster 100. The communication device 401 includes various types of interfaces such as Network Interface Card (NIC), Universal Serial Bus (USB) or the like.

Information for the processor 404 to execute a process is inputted to the input output device 402. In addition, the input output device 402 outputs a result of the process that the processor 404 executes. The input output device 402 includes various types of input devices and output devices, for example a keyboard, a mouse, a microphone, a display, a speaker, a touch panel or the like. The input output device 402 may be omitted.

The storage device 403 stores various types of data for controlling the propulsion apparatus 10, for example a control program 500. The storage device 403 is used as a non-transitory tangible storage medium that stores the control program 500. The control program 500 may be provided as a computer program product stored in a computer readable storage medium 3, or may be provided as a computer program product that is downloadable from a server.

The processor 404 performs various types of data processes for controlling the propulsion apparatus 10. The processor 404 reads the control program 500 from the storage device 403, executes it and generates the control signal for controlling the propulsion apparatus 10. For example, the processor 404 includes a Central Processing Unit (CPU) or the like.

Figure 12:
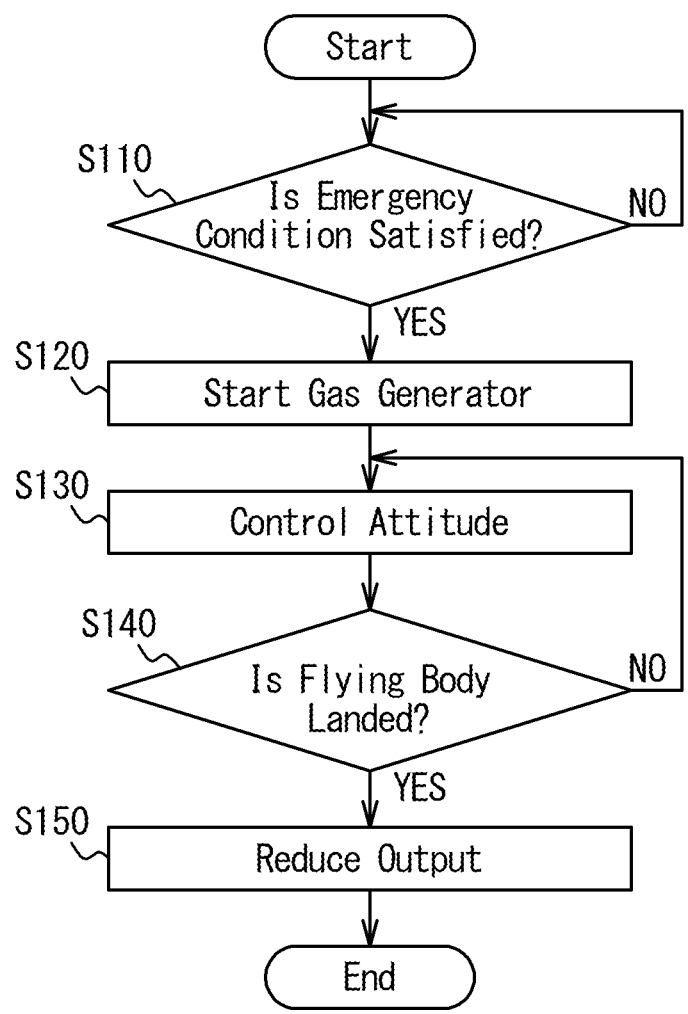
FIG. 12 is a flowchart that shows a process performed by a controller in an embodiment.

The processor 404 executes the process shown in FIG. 12 by executing the control program 500. The processor 404 starts the process shown in FIG. 12 when the flying body 1 starts flying, for example. In step S110, the processor 404 determines whether an emergency condition is satisfied. When an emergency condition is satisfied (S110: Yes), the processor 404 executes a process in step S120. When no emergency condition is satisfied (S110: No), the processor 404 waits until an emergency condition is satisfied. For example, the emergency condition may include that an engine of the flying body 1 is stopped. It may be determined whether an emergency condition is satisfied based on the altitude of the flying body 1. For example, the emergency condition may include that the altitude of the flying body 1 is lower than a set altitude. The emergency condition may include that the controller 400 receives an emergency signal from the control device 30. The emergency condition may be satisfied by a combination of above, for example when the engine is stopped and the altitude of the flying body 1 is lower than the set altitude.

In step S120, the processor 404 starts the gas generator 200. When started, the gas generator 200 combusts the fuel 220 and generates the combustion gas. The generated combustion gas is supplied to each thruster 100 through the manifolds 300.

In step S130, the processor 404 controls an attitude of the flying body 1 by controlling the thrusters 100. The processor 404 controls the outputs of the thrusters 100 based on the status information from the measuring device 20, for example the tilt of the flying body 1. The processor 404 controls the tilt of the flying body 1 by controlling the thrusters 100. For example, the processor 404 controls the output of each thruster 100 so that the upper direction (the Z direction) of the flying body 1 is perpendicular to the ground surface. For example, when the Z direction is tilted forward, the output of the first thruster 100-1 and the output of the second thruster 100-2 are controlled to become greater than the output of the third thruster 100-3 and the output of the fourth thruster 100-4.

The processor 404 controls the outputs of the thrusters 100 so as to reduce a decent speed of the flying body 1. The processor 404 controls the outputs of the thrusters 100 based on the status information received from the measuring device 20, for example the altitude and the speed of the flying body 1. When the speed of the flying body 1, for example a vertical downward speed, is greater than a predetermined threshold value, the processor 404 makes the outputs of the thrusters 100 greater and reduces the decent speed of the flying body 1. The processor 404 may control the thrusters 100 so that the altitude of the flying body 1 is lowered without rising of the flying body 1. The processor 404 may control the thrusters 100 so that the impact when the flying body 1 touches down becomes smaller than an impact of a parachute decent. The processor 404 may control the thrusters 100 so that the impact when the flying body 1 touches down becomes smaller than an impact when it falls from an altitude of 3 meters. The processor 404 may control the thrusters 100 so that the impact when the flying body 1 touches down becomes smaller than an impact when it falls from an altitude of 1 meter.

In step S140, the processor 404 determines whether the flying body 1 is landed. The processor 404 may determine whether the flying body 1 is in contact with the ground based on the status information received from the measuring device 20, for example the altitude of the flying body 1. When the processor 404 determines that the flying body 1 is not in contact with the ground (step S140: No), the processor 404 performs the process of the step S130 until the flying body 1 becomes in contact with the ground. When the processor 404 determines that the flying body 1 is in contact with the ground (step S140: Yes), the processor 404 executes a process of step S150.

In step S150, the processor 404 reduces the outputs of the thrusters 100 so that the flying body 1 does not rise. The outputs of the thrusters 100 after being reduced may be determined in accordance with a weight of the flying body 1. For example, a thrust generated by the thrusters 100 at the reduced outputs may be less than or equal to a gravity applied to the flying body 1. The processor 404 may carry on driving the thrusters 100 with the outputs by which the flying body 1 does not rise until the fuel 220 inside the gas generator 200 runs out. In the step S150, the processor 404 may reduce the outputs of the thrusters 100 until the thrusters 100 stop.

As described above, the flying body 1 can reduce the impact due to a fall in an emergency by providing the propulsion apparatus 10.

Figure 13:
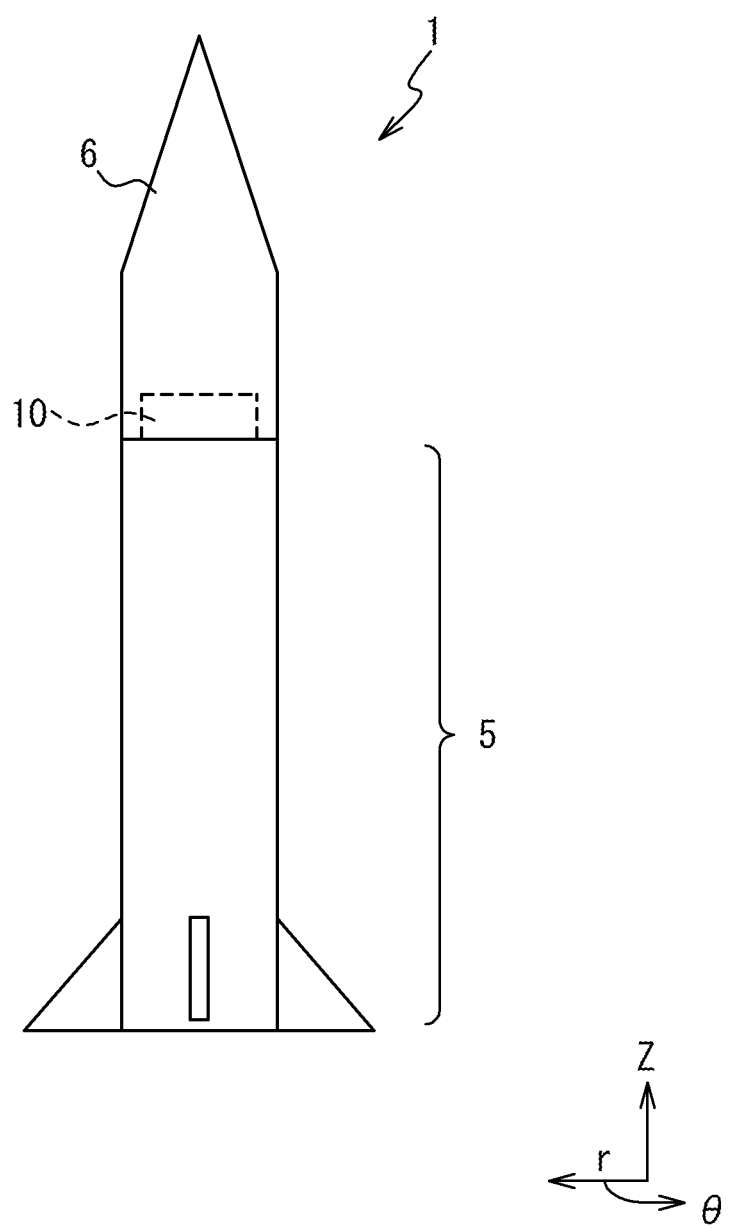
FIG. 13 is a schematic diagram of a flying body according to an embodiment.

(Embodiment 2) As shown in FIG. 13, a flying body 1 according to the present embodiment may be provided with one or more boosters 5 and a payload 6. For example, the flying body 1 may include a rocket or a missile. The boosters 5 accelerate the flying body 1 and separate from the payload 6 while the flying body 1 is flying. For example, the boosters 5 separate from the payload 6 when the fuel for accelerating the flying body 1 runs out. To facilitate understanding, the following will be described by use of a cylindrical coordinate system with the upper direction of the flying body 1 when it is flying, for example the direction of travel, as the +Z direction. The Z axis passes through a center of the flying body 1 and a r direction indicates a distance from the Z axis. A θ direction indicates a rotation direction with the Z axis as a center.

The propulsion apparatus 10 is provided to a booster 5 that separates when the flying body 1 flies. The propulsion apparatus 10 may be provided at an end of the booster 5 in the +Z direction, for example at an edge of the booster 5 in the +Z direction. For example, the propulsion apparatus 10 may be configured so that the booster 5 is mountable on a bottom part of the propulsion apparatus 10. The propulsion apparatus 10 may be provided at a location where the booster 5 is separated from the flying body 1. When the flying body 1 is provided with a plurality of boosters 5, a propulsion apparatus 10 may be provided to each booster 5.

Figure 14:
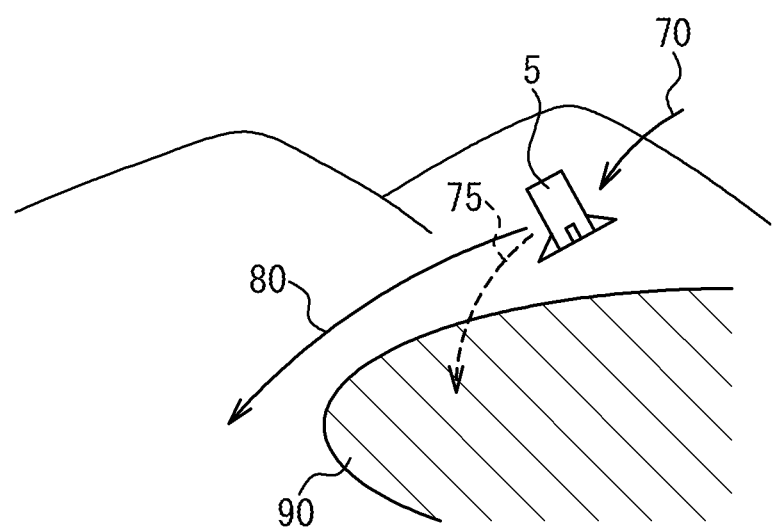
FIG. 14 is a diagram to describe an operation of a propulsion apparatus in an embodiment.

As shown in FIG. 14, the propulsion apparatus 10 may control a position where the booster 5 falls. The booster 5 falls, after being separated from the flying body 1, along the trajectory 70. When it is predicted that the booster 5 falls along a predicted trajectory 75 to an area 90 with a large impact, for example a city, the propulsion apparatus 10 controls the position where the booster 5 falls so that the booster 5 falls outside a range of the area 90. By controlling the fall position of the booster 5 by the propulsion apparatus 10, the booster 5 falls along a corrected trajectory 80 outside the range of the area 90. As a result, the impact due to the fall of the booster 5 can be reduced.

Figure 15:
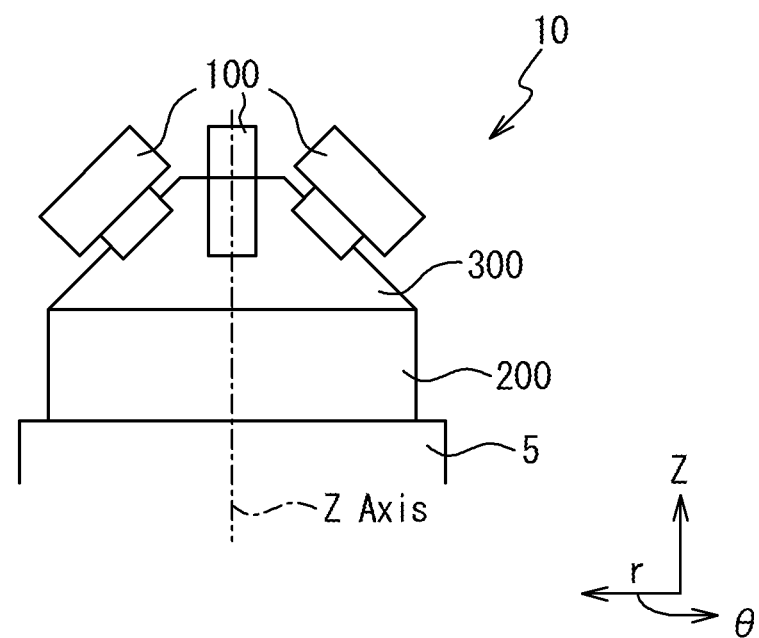
FIG. 15 is a schematic diagram of a propulsion apparatus according to an embodiment.

The propulsion apparatus 10 may be configured to generate thrust in upper direction when mounted to the booster 5. As shown in FIG. 15, the propulsion apparatus 10 is provided with a plurality of thrusters 100, a gas generator 200 and a manifold 300. The thrusters 100 are configured to output, in an emergency, for example when it is predicted that the booster 5 will fall to the area 90, the combustion gas that the gas generator 200 generates, downward with respect to the flying body 1 during a flight.

The gas generator 200 is provided at an end of the booster 5 in the +Z direction and is supported by the booster 5. The gas generator 200 is formed in a pillar shape, for example a cylindrical column shape, with an axis parallel to the Z axis.

The gas generator 200 is configured to generate a combustion gas in an emergency, similarly to the embodiment 1. The gas generator 200 is provided inside with a fuel 220 and a pressure detector 230. The fuel 220 includes for example a solid fuel and the gas generator 200 generates the combustion gas by combusting the fuel 220.

The manifold 300 is configured to send the combustion gas that the gas generator 200 generates to the thrusters 100, similarly to the embodiment 1. The manifold 300 is provided for example at an end of the gas generator 200 in the +Z direction.

The thrusters 100 are configured to output the combustion gas that the gas generator 200 generates from pintle valves 120, similarly to the embodiment 1. The thrusters 100 controls outputs of the combustion gas by control of valve openings of the pintle valves 120 by actuators 110.

Figure 16:
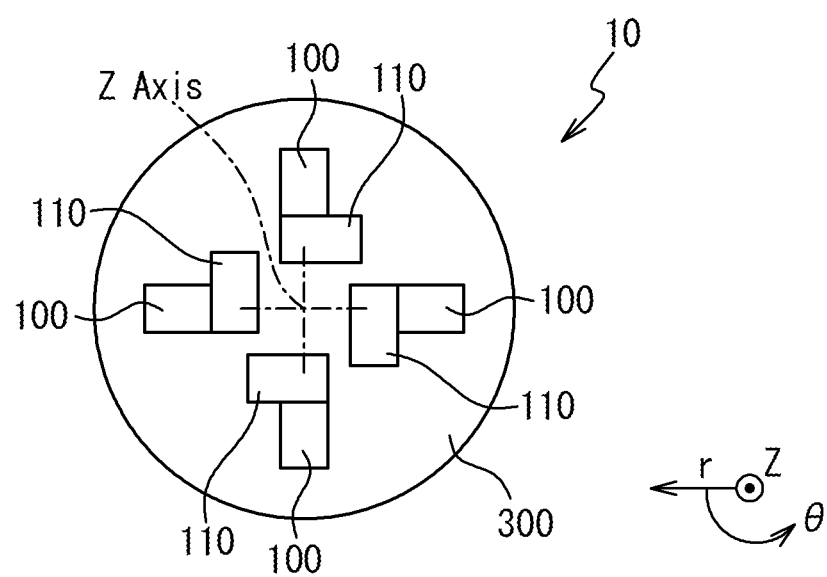
FIG. 16 is a top view of a propulsion apparatus according to an embodiment.

Each thruster 100 may be provided to the manifold 300 in the +Z direction. As shown in FIG. 16, each thruster 100 may be arranged to be in a rotational symmetry, for example in a quadruple rotational symmetry, around the Z axis. As a result, the attitude and the fall position of the booster 5 can be controlled by controlling outputs of the thrusters 100.

The thrusters 100, the manifold 300 and the gas generator 200 may be provided to overlap each other when viewed from the Z direction. As a result, a surface of the propulsion apparatus 10 when viewed from the +Z direction, that is the direction of travel of the flying body 1, becomes smaller and an air resistance of the flying body 1 can be reduced.

Figure 17:
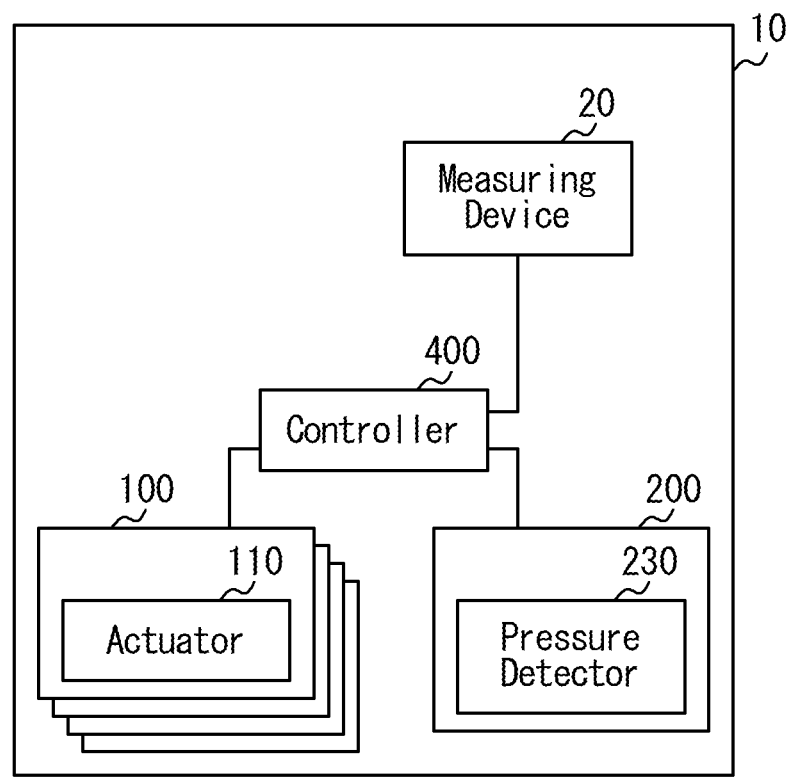
FIG. 17 is a configuration diagram of a propulsion apparatus according to an embodiment.

As shown in FIG. 17, the propulsion apparatus 10 may be provided with a controller 400 that starts the gas generator 200 and a measuring device 20 that measures a status of the booster 5. The controller 400 receives various types of status information from the measuring device 20 and determines whether to start the gas generator 200 or not based on the status information, similarly to the embodiment 1. The measuring device 20 may be provided to the booster 5.

The controller 400 controls the outputs of the thrusters 100 based on an inner pressure in the gas generator 200 and the status information of the booster 5, similarly to the embodiment 1. As details are similar to the embodiment 1, description thereof will be omitted.

Figure 18:
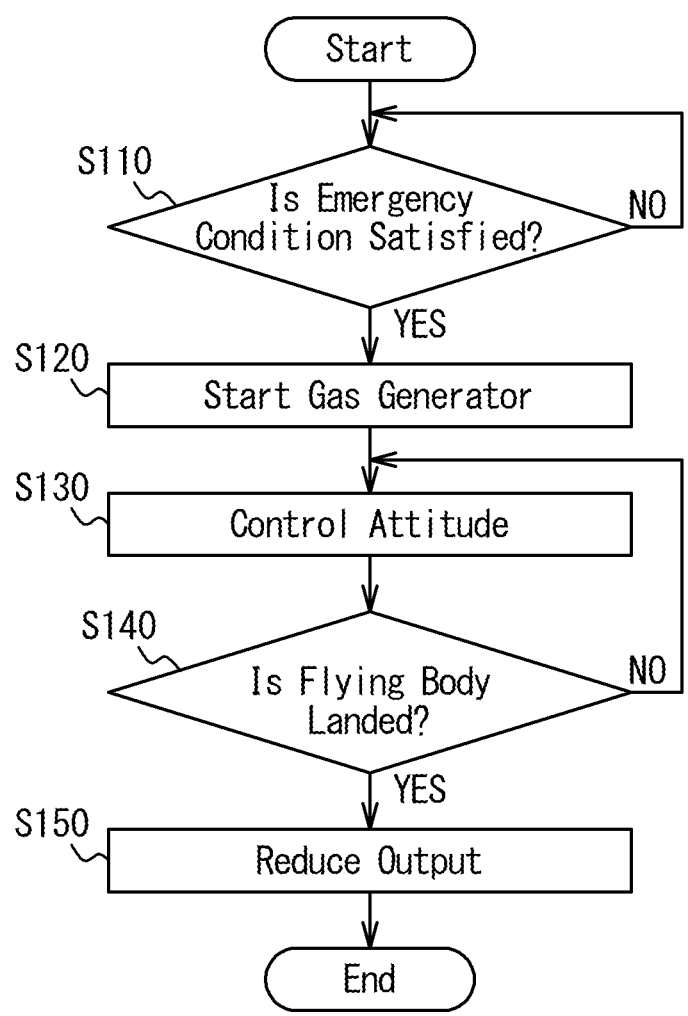
FIG. 18 is a flowchart that shows a process performed by a controller in an embodiment.

The processor 404 of the controller 400 executes the control program 500, similarly to the embodiment 1. For example, the processor 404 executes the control program 500 to execute the process shown in FIG. 18. The processor 404 starts the process shown in FIG. 18 when the flying body 1 starts flying, for example.

In step S110, the processor 404 determines whether an emergency condition is satisfied. When an emergency condition is satisfied (S110: Yes), the processor 404 executes a process in step S120. When no emergency condition is satisfied (S110: No), the processor 404 waits until an emergency condition is satisfied.

The emergency condition may include a possibility that the booster 5 may fall in the area 90. In this case, the processor 404 predicts a fall position of the booster 5 based on the status information, for example a position (for example a latitude, a longitude and a height) and a speed, of the booster 5. The processor 404 determines whether an emergency condition is satisfied based on the predicted fall position of the booster 5. For example, when the predicted fall position is included in the area 90, the processor 404 determines that the emergency condition is satisfied.

In step S120, the processor 404 starts the gas generator 200. When started, the gas generator 200 combusts the fuel 220 and generates the combustion gas. The generated combustion gas is supplied to each thruster 100 through the manifold 300.

In step S130, the processor 404 controls an attitude of the booster 5 by controlling the thrusters 100. The processor 404 controls the outputs of the thrusters 100 based on the status information from the measuring device 20, for example the tilt of the booster 5. The processor 404 may control the outputs of the thrusters 100 based on the position of the booster 5. The processor 404 controls the fall position of the booster 5 by controlling the outputs of the thrusters 100.

The processor 404 controls the thrusters 100 so that the booster 5 does not fall in the area 90. The processor 404 controls the outputs of the thrusters 100 based on the status information from the measuring device 20, for example the position and the speed of the booster 5. The processor 404 calculates the corrected trajectory 80 along which the booster 5 is made to fall outside the range of the area 90, based on the position and the speed of the booster 5. The processor 404 controls the thrusters 100 so that the booster 5 moves along the calculated corrected trajectory 80.

The processor 404 may control the outputs of the thrusters 100 so as to reduce the decent speed of the booster 5, similarly to the embodiment 1. As a result, the impact due to the fall of the booster 5 can be reduced.

As steps S140 to S150 are similar to the embodiment 1, descriptions thereof will be omitted.

As described above, the propulsion apparatus 10 can generate the combustion gas and control a fall position of at least a part of the flying body 1 when at least a part of the flying body 1, for example the booster 5, satisfies an emergency condition. As a result, the propulsion apparatus 10 can reduce an impact due to a fall of the booster 5.

Figure 19:
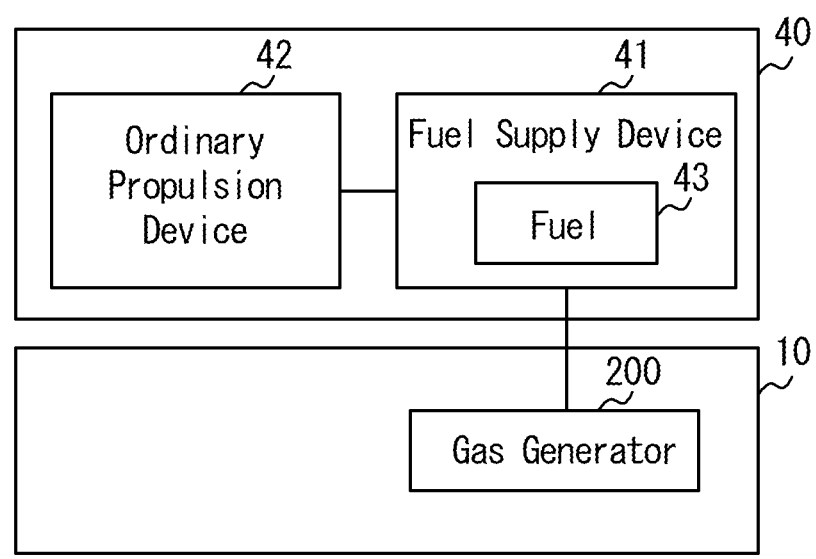
FIG. 19 is a configuration diagram related to a fuel supply device according to an embodiment.

(Variation examples) Fuel may be supplied from the body 40 of the flying body 1 to the gas generator 200. In this case, for example, as shown in FIG. 19, the gas generator 200 is connected to a fuel supply device 41 of the body 40. The fuel supply device 41 stores fuel 43 that is usually used by the flying body 1 when flying. The fuel supply device 41 supplies the fuel 43 to an ordinary propulsion device 42 that is different from the propulsion apparatus 10. In addition, when an emergency condition is satisfied, the fuel supply device 41 supplies the fuel 43 from the body 40 to the gas generator 200. The gas generator 200 stores oxidizer and generates the combustion gas by adding the oxidizer to the supplied fuel and combusting. As a result, the gas generator 200 can be made smaller. In addition, the fuel 220 provided to the gas generator 200 may be a liquid fuel. The solid fuel provided to the gas generator 200 may include oxidizer. When the gas generator 200 is provided with fuel, no fuel may be supplied to the gas generator 200 from outside.

The area 90 may be an area where a fall is allowed. In this case, the processor 404 starts the gas generator 200 in step S120 in FIG. 18 when the predicted fall position of the booster 5 is not included in the area 90 in step S110 in FIG. 18. In addition, in step S130, the processor 404 controls the thrusters 100 so that the booster 5 falls in the area 90.

The emergency condition may include an unstable attitude of the flying body 1. When the processor 404 determines that the attitude of the flying body 1 is unstable, the processor 404 starts the gas generator 200 to control the attitude of the flying body 1. In this case, the processor 404 may control the ordinary propulsion device 42 that the flying body 1 usually uses when flying. For example, the processor 404 may reduce a thrust of the ordinary propulsion device 42.

The embodiments and variation examples as described above are examples and may be modified as long as functions are not inhibited. In addition, the configurations described in each of embodiments and variation examples may be arbitrarily modified and/or arbitrarily combined as long as functions are not inhibited. For example, the propulsion apparatus 10 according to the embodiment 1 may control the fall position of the flying body 1 similarly to the propulsion apparatus 10 according to the embodiment 2.

The propulsion apparatus described in each embodiment is understood for example as follows.

A propulsion apparatus (10) according to a first aspect is provided with a gas generator (200) and a plurality of thrusters (100). The gas generator (200) generates a combustion gas when at least a part of a flying body (1, 5) satisfies an emergency condition. The plurality of thrusters (100) output the combustion gas downward.

The propulsion apparatus can reduce an impact when at least a part of the flying body falls and can reduce an impact due to a fall of the flying body, by outputting the combustion gas downward when an emergency condition is satisfied. It should be noted that the at least a part of the flying body includes the flying body (1) and a booster (5).

A propulsion apparatus according to a second aspect is the propulsion apparatus according to the first aspect and the plurality of thrusters is configured to overlap the gas generator when viewed from a direction of travel of at least a part of the flying body.

As a result, a surface of the propulsion apparatus when viewed from the direction of travel of the flying body is made smaller.

A propulsion apparatus according to a third aspect is the propulsion apparatus according to the first aspect and the plurality of thrusters are configured to control an attitude of at least a part of the flying body (1, 5).

As a result, the propulsion apparatus can make the attitude of at least a part of the flying body stable even when an emergency has occurred.

A propulsion apparatus according to a fourth aspect is the propulsion apparatus according to the first aspect and the plurality of thrusters are configured to reduce an output of the combustion gas to a first output based on a landing of at least a part of the flying body.

A propulsion apparatus according to a fifth aspect is the propulsion apparatus according to the fourth aspect and is configured so that the first output is determined based on a weight of at least a part of the flying body.

A propulsion apparatus according to a sixth aspect is the propulsion apparatus according to the fourth aspect and is configured so that a thrust of the plurality of thrusters at the first output is less than or equal to a gravity applied to at least a part of the flying body.

A propulsion apparatus according to a seventh aspect is the propulsion apparatus according to the first aspect and is configured so that the plurality of thrusters carries on outputting the combustion gas after at least a part of the flying body is landed.

A propulsion apparatus according to an eighth aspect is the propulsion apparatus according to the first aspect and is configured so that the plurality of thrusters carries on outputting the combustion gas after at least a part of the flying body is landed, until fuel of the gas generator runs out.

As a result, the propulsion apparatus can make the attitude of the flying body stable until at least a part of the flying body lands.

A propulsion apparatus according to a ninth aspect is the propulsion apparatus according to the first aspect and is configured so that the emergency condition is determined whether to be satisfied based on an altitude of at least a part of the flying body (1, 5).

A propulsion apparatus according to a tenth aspect is the propulsion apparatus according to the first aspect and is configured so that the emergency condition is determined whether to be satisfied based on an expected fall position of at least a part of the flying body (1, 5).

The flying body according to each embodiment is understood for example as follows.

A flying body (1) according to an eleventh aspect is provided with the propulsion apparatus (10) according to the first aspect.

As a result, an impact when the flying body falls can be reduced and an impact due to a fall of a flying body can be reduced.

A flying body (1) according to a twelfth aspect is the flying body according to the eleventh aspect and is further provided with a booster (5) to which the propulsion apparatus is attached and a payload (6).

As the propulsion apparatus is attached to the booster, a fall position of the booster can be controlled. In addition, the propulsion apparatus may reduce an impact when the booster falls.

A flying body according to a thirteenth aspect is the flying body according to the twelfth aspect and the propulsion apparatus is provided to an end in a direction of travel of the booster.

A flying body according to a fourteenth aspect is the flying body according to the eleventh aspect and is further provided with wheels to drive on a road.

A flying body according to a fifteenth aspect is the flying body according to the fourteenth aspect and is further provided with an ordinary propulsion device (42) and a fuel supply device (41). The fuel supply device (41) supplies fuel to the gas generator (200) and the gas generator (200) adds oxidizer to the supplied fuel and combusts the fuel added with the oxidizer.

The propulsion method according to each embodiment is understood for example as follows.

A propulsion method according to a sixteenth aspect includes determining, by a processor (404), whether at least a part of a flying body (1, 5) satisfies an emergency condition. The propulsion method further includes generating a combustion gas when the emergency condition is satisfied and outputting the combustion gas downward at least a part of the flying body.

An impact due to a fall of a flying body can be reduced by outputting combustion gas downward the flying body.

It should be noted that the present application claims priority based on Japanese Patent Application No. 2020-022075, filed on Feb. 13, 2020, the whole disclosure of which is incorporated herein by reference.

The invention claimed is:

1. A propulsion apparatus for a flying body, comprising:
a processor;
a gas generator configured to generate combustion gas;
a measuring device to generated status information of the flying body; and
a plurality of thrusters configured to output the combustion gas downward,
wherein the processor is configured to receive the status information of the flying body from the measuring device; based upon the status information, predict the flying body is to land in an area; determine whether at least one part of the flying body satisfies an emergency condition, determine the emergency condition is the at least one part of the flying body is predicted to land in the area, to cause the gas generator to generate the combustion gas upon determining that the at least one part of the flying body satisfies the emergency condition, and control the plurality of thrusters so that the at least one part of the flying body lands outside the area;
wherein the processor is further configured to determine whether the at least one part of the flying body is landed, to reduce an output of the combustion gas to a first output by which the flying body does not rise upon determining that the at least one part of the flying body is landed, and to cause the gas generator to continue outputting the combustion gas at the first output after the at least one part of the flying body is landed, and
wherein the processor is further configured to control outputs of the thrusters based on an altitude and a speed of the flying body.

2. The propulsion apparatus according to claim 1,
wherein the plurality of thrusters is further configured to overlap the gas generator when viewed from a direction of travel of the at least one part of the flying body.

3. The propulsion apparatus according to claim 1,
wherein the plurality of thrusters is further configured to control an attitude of the flying body.

4. The propulsion apparatus according to claim 1,
wherein the first output is determined based on a weight of the at least one part of the flying body.

5. The propulsion apparatus according to claim 1,
wherein a thrust of the plurality of thrusters at the first output is less than or equal to a weight of the at least one part of the flying body.

6. The propulsion apparatus according to claim 1,
wherein the plurality of thrusters is further configured to carry on outputting the combustion gas at the first output after the at least one part of the flying body is landed until fuel of the gas generator runs out.

7. The propulsion apparatus according to claim 1,
wherein the processor is configured to determine whether the emergency condition is satisfied based on an altitude of the at least one part of the flying body.

8. The propulsion apparatus according to claim 1,
wherein the processor is configured to determine whether the emergency condition is satisfied based on an expected fall position of the at least one part of the flying body.

9. A flying body comprising the propulsion apparatus according to claim 1.

10. The flying body according to claim 9, further comprising:
a booster to which the propulsion apparatus is attached; and
a payload attached in a direction of travel of the booster,
wherein the booster is configured to separate from the payload during a flight.

11. The flying body according to claim 10,
wherein the propulsion apparatus is provided at a location where the booster separates from the payload.

12. The flying body according to claim 9, further comprising:
wheels configured to drive on a road.

13. The flying body according to claim 12, further comprising:
an ordinary propulsion device different from the propulsion apparatus; and
a fuel supply device configured to supply fuel to the ordinary propulsion device,
wherein the fuel supply device is further configured to supply the fuel to the gas generator,
wherein the gas generator is further configured to:
store oxidizer;
add the oxidizer to the fuel supplied from the fuel supply device; and
combust the fuel added with the oxidizer.

14. A propulsion apparatus for a flying body, comprising:
a processor;
a gas generator configured to generate combustion gas;
a measuring device to generated status information of the flying body; and
a plurality of thrusters configured to output the combustion gas downward,
wherein the processor is configured to receive the status information of the flying body from the measuring device; based upon the status information, predict the flying body is to land in an area; determine whether at least one part of the flying body satisfies an emergency condition, determine the emergency condition is the at least one part of the flying body is predicted to land in the area, to cause the gas generator to generate the combustion gas upon determining that the at least one part of the flying body satisfies the emergency condition, and control the plurality of thrusters so that the at least one part of the flying body lands outside the area;
wherein the processor is further configured to determine whether the at least one part of the flying body is landed, to reduce an output of the combustion gas to a first output by which the flying body does not rise upon determining that the at least one part of the flying body is landed, and to cause the gas generator to continue outputting the combustion gas at the first output after the at least one part of the flying body is landed, and
wherein the processor is further configured to control outputs of the thrusters based on an altitude and a speed of the flying body.

* * * * *